US012682139B2

(12) United States Patent
Topac et al.

(10) Patent No.: US 12,682,139 B2
(45) Date of Patent: Jul. 14, 2026

(54) ADAPTIVE DESIGN AND OPTIMIZATION USING PHYSICS-INFORMED NEURAL NETWORKS

(71) Applicant: Accenture Global Solutions Limited, Dublin (IE)

(72) Inventors: Omer Tanay Topac, Stanford, CA (US); Mohamad Mehdi Nasr-Azadani, San Francisco, CA (US); Sanjoy Paul, Sugar Land, TX (US); Aaron Jacob Crow, San Lorenzo, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1004 days.

(21) Appl. No.: 17/887,995

(22) Filed: Aug. 15, 2022

(65) Prior Publication Data

US 2023/0062600 A1      Mar. 2, 2023

Related U.S. Application Data

(60) Provisional application No. 63/238,326, filed on Aug. 30, 2021.

(51) Int. Cl.
| | |
|---|---|
| *G06F 30/27* | (2020.01) |
| *G06F 119/02* | (2020.01) |
| *G06N 3/02* | (2006.01) |

(52) U.S. Cl.
CPC .............. *G06F 30/27* (2020.01); *G06N 3/02* (2013.01); *G06F 2119/02* (2020.01)

(58) Field of Classification Search
CPC ....... G06F 30/27; G06F 2119/02; G06N 3/02; G06N 3/0464; G06N 3/048; G06N 3/042; G06N 3/084; G06N 3/0985
See application file for complete search history.

(56) References Cited

U.S. PATENT DOCUMENTS

| | | | |
|---|---|---|---|
| 10,963,540 | B2 | 3/2021 | Raissi et al. |
| 2021/0110302 | A1 | 4/2021 | Nam et al. |

OTHER PUBLICATIONS

Lu, Lu, NPL, "A Deep Learning Library for Solving Differential Equations", Published Feb. 14, 2020 (Year: 2020).*

(Continued)

*Primary Examiner* — Rehana Perveen
*Assistant Examiner* — Angel Calle
(74) *Attorney, Agent, or Firm* — Mannava & Kang, P.C.

(57)                ABSTRACT

The present disclosure relates to systems, methods, and products for adaptive design and optimization using a physics-informed neural network (PINN). The system includes a non-transitory memory and a processor. The processor executes instructions to cause the system to: input collocation points and design parameters into the PINN to obtain an output; calculate a loss function based on a set of governing equations and the output; determine whether the PINN is convergent based on the calculated loss function; in response to the PINN being convergent, export the PINN; and in response to the PINN not being convergent: determine whether to resample the collocation points; determine an optimum number of collocation points; determine a set of optimal network parameters for adjusting the PINN; and input the collocation points and the set of optimal network parameters to the PINN for a next iteration.

20 Claims, 12 Drawing Sheets

(56)　　　　　　References Cited

OTHER PUBLICATIONS

Carlos j. G. Rojas, NPL, "Parameter Identification for a Damage Model Using a Physics Informed Neural Network", Published Jun. 25, 2021 (Year: 2021).*

Shengze Cai, NPL, "Physics-Informed Neural Network for Heat Transfer Problems", Published Apr. 21, 2021 (Year: 2021).*

Ameya D. Jagtap, NPL, "Locally adaptive activation functions with slope recovery for deep and physics-informed neural networks", Published Jul. 15, 2020 (Year: 2020).*

Atilim Gunes Baydin et al., "Automatic differentiation in machine learning: a survey," *Journal of machine learning research*, Apr. 18, 2018.

Ian Goodfellow et al., "*Deep Learning*," MIT Press, 2016.

Xin He et al., "Automl: A survey of the state-of-the-art," *Knowledge—Based Systems*, 212:106622, 2021.

George Em Karniadakis et al., "Physics-informed machine learning," *Nature Reviews Physics*, 3:422-440, 2021.

Alex Krizhevsky et al., "Imagenet classification with deep convolutional neural networks," *Advances in neural information processing systems*, 25:1097-1105, 2012.

Yann LeCun et al., "Deep learning," *Nature*, 521(7553):436-444, 2015.

Maziar Raissi et al., "Physics-informed neural networks: A deep learning framework for solving forward and inverse problems involving nonlinear partial differential equations," *Journal of Computational Physics*, 378:686-707, 2019.

Yao Yang et al., "Resource-aware pareto- optimal automated machine learning platform," In *2020 3rd International Seminar on Research of Information Technology and Intelligent Systems (ISRITI)*, pp. 1-6. IEEE, 2020.

* cited by examiner

220

Processor(s) 221

Memories 222

Operating System 224

Control Instructions 226

Topic Discovery Component 228

Communication Interfaces 202

Transmit / Receive Circuitry 212
WLAN | Satellite | 1G

Antenna(s) 214

Tx / Rx Circuitry 216
Ethernet | SONET / SDH | DSL | Cable

System Circuitry 204

I/O Interfaces 206

Display Circuitry 208

Machine Interfaces 210

Storage 209

200

400

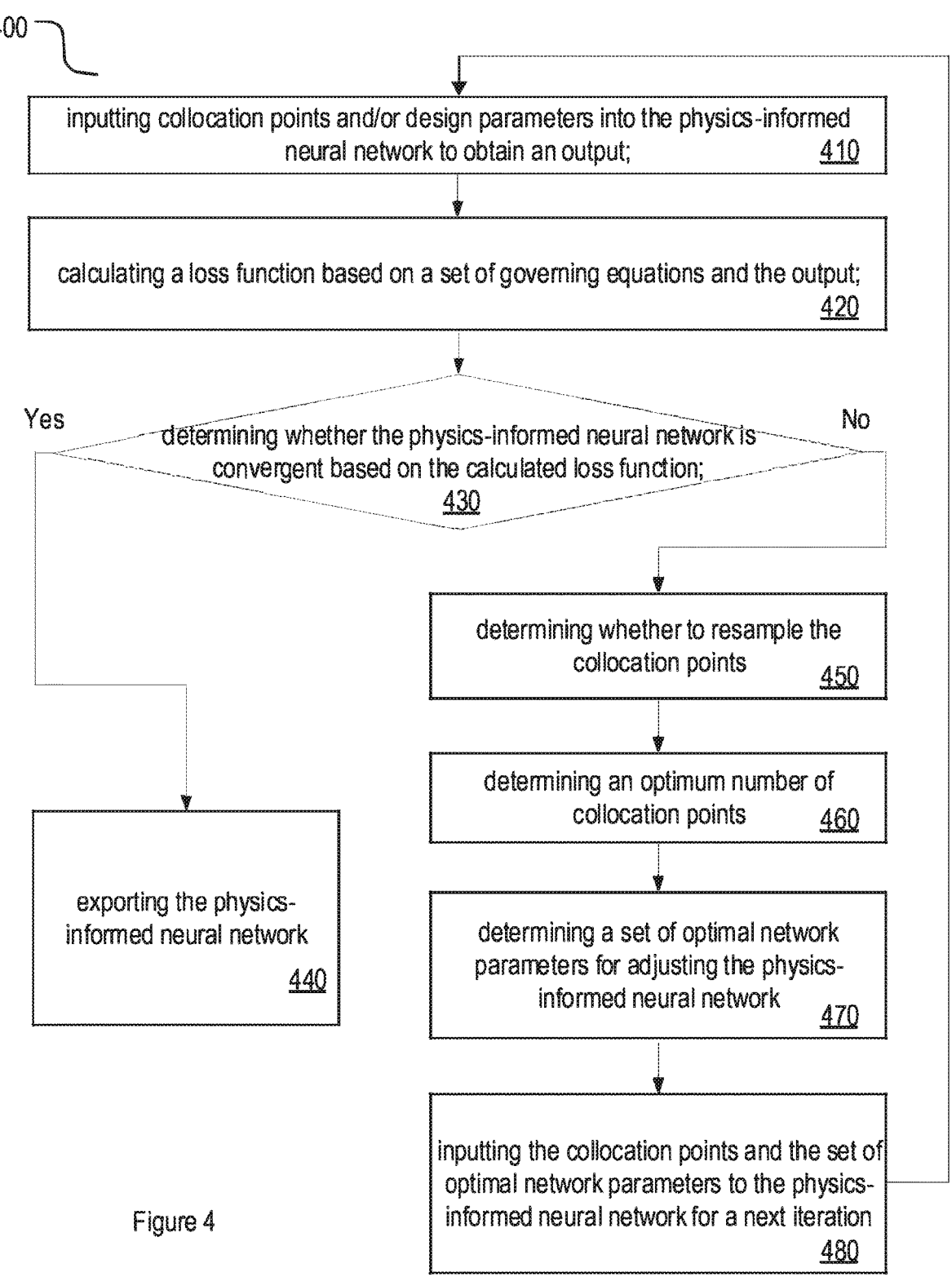

inputting collocation points and/or design parameters into the physics-informed neural network to obtain an output;     410 calculating a loss function based on a set of governing equations and the output;     420

Yes     determining whether the physics-informed neural network is convergent based on the calculated loss function;     No

430 determining whether to resample the collocation points     450 determining an optimum number of collocation points     460 exporting the physics-informed neural network

440 determining a set of optimal network parameters for adjusting the physics-informed neural network     470 inputting the collocation points and the set of optimal network parameters to the physics-informed neural network for a next iteration

CANDIDATE #2:

Outputs:
Lift Coeff: 0.06
Drag Coeff: 0.923

Design Parameters:
Hor. length: 0.32 m
Ver. length: 0.11 m
Rot: 2.2°

CANDIDATE #1:

Outputs:
Lift Coeff: 0.00
Drag Coeff: 0.912

Design Parameters:
Hor. length: 0.3 m
Ver. length: 0.1 m
Rot: 0°

CANDIDATE #1:

Design Parameters:
Hor. length: 0.3 m
Ver. length: 0.12 m
Rot: 4.1°

Outputs:
Lift Coeff: 0.121
Drag Coeff: 0.921

CANDIDATE #2:

Design Parameters:
Hor. length: 0.41 m
Ver. length: 0.16 m
Rot: 6.2°

Outputs:
Lift Coeff: 0.219
Drag Coeff: 0.954

ADAPTIVE DESIGN AND OPTIMIZATION USING PHYSICS-INFORMED NEURAL NETWORKS

RELATED APPLICATION

The present application claims the benefit of U.S. Provisional Application No. 63/238,326 filed on Aug. 30, 2021, which is incorporated by reference in its entirety.

TECHNICAL FIELD

This disclosure relates in general to the fields of machine learning and neural network, and particularly relates to the fields of using physics-informed neural networks in systems having adaptive design and optimization capabilities.

BACKGROUND

Neural networks (NN)s are computing systems that emulate biological learning process relying on their artificial connected computing units inspired by neurons in animal brains. With broader data availability, enhanced computational resources, and improved algorithms, it may be possible to effectively train deep NNs (DNNs) that may approximate certain mathematical function with a certain complexity.

While DNNs may be useful in many application areas where a large amount data is available and continuously generated, their reliance on big data may be an obstacle in some other cases. One of these areas may be the DNN-based multi-cycle development for engineering products, which involve multiple levels of detailed physics simulations.

The present disclosure describes methods, devices, and systems for adaptive design and optimization using physics-informed neural networks (PINNs). PINNs are distinct from data-driven DNNs in that partial differential equations (PDEs), or similarly ordinary differential equations (ODEs), imposed by the governing physics, together with boundary conditions (BCs) and initial conditions (ICs) imposed by the setup of the physical problem are embedded into the loss function of the PINNs.

SUMMARY

The present disclosure describes various systems, methods, and/or products for adaptive design and optimization implementations with a physics-informed neural network (PINN).

The present disclosure describes a system for adaptive design and optimization of an engineering design using a physics-informed neural network. The system includes a non-transitory memory storing instructions; and a processor in communication with the non-transitory memory. The processor executes the instructions to cause the system to: input collocation points and/or design parameters into the physics-informed neural network to obtain an output; calculate a loss function based on a set of governing equations and the output; determine whether the physics-informed neural network is convergent based on the calculated loss function; in response to the physics-informed neural network being convergent, export the physics-informed neural network; and in response to the physics-informed neural network not being convergent: determine whether to resample the collocation points; determine an optimum number of collocation points; determine a set of optimal network parameters for adjusting the physics-informed neural network; and input the collocation points and the set of optimal network parameters to the physics-informed neural network for a next iteration.

The present disclosure also describes a method for adaptive design and optimization of an engineering design using a physics-informed neural network. The method includes inputting, by a device, collocation points and/or design parameters into the physics-informed neural network to obtain an output. The device includes a memory storing instructions and a processor in communication with the memory. The method further includes calculating, by the device, a loss function based on a set of governing equations and the output; determining, by the device, whether the physics-informed neural network is convergent based on the calculated loss function; in response to the physics-informed neural network being convergent, exporting, by the device, the physics-informed neural network; and in response to the physics-informed neural network not being convergent: determining, by the device, whether to resample the collocation points; determining, by the device, an optimum number of collocation points; determining, by the device, a set of optimal network parameters for adjusting the physics-informed neural network; and inputting, by the device, the collocation points and the set of optimal network parameters to the physics-informed neural network for a next iteration.

The present disclosure further describes a product for topic discovery. The product includes machine-readable media other than a transitory signal; and instructions stored on the machine-readable media, wherein when a processor executes the instructions, the processor is configured to: input collocation points and/or design parameters into a physics-informed neural network to obtain an output; calculate a loss function based on a set of governing equations and the output; determine whether the physics-informed neural network is convergent based on the calculated loss function; in response to the physics-informed neural network being convergent, export the physics-informed neural network; and in response to the physics-informed neural network not being convergent: determine whether to resample the collocation points; determine an optimum number of collocation points; determine a set of optimal network parameters for adjusting the physics-informed neural network; and input the collocation points and the set of optimal network parameters to the physics-informed neural network for a next iteration.

In another aspect, an embodiment of the present disclosure provides non-transitory computer-readable mediums storing instructions which when executed by a computer cause the computer to perform the above methods.

The above and other aspects and their implementations are described in greater detail in the drawings, the descriptions, and the claims.

BRIEF DESCRIPTION OF THE DRAWINGS

FIG. 4 shows a flow diagram of an exemplary PINN platform.

DETAILED DESCRIPTION

Figure 1:
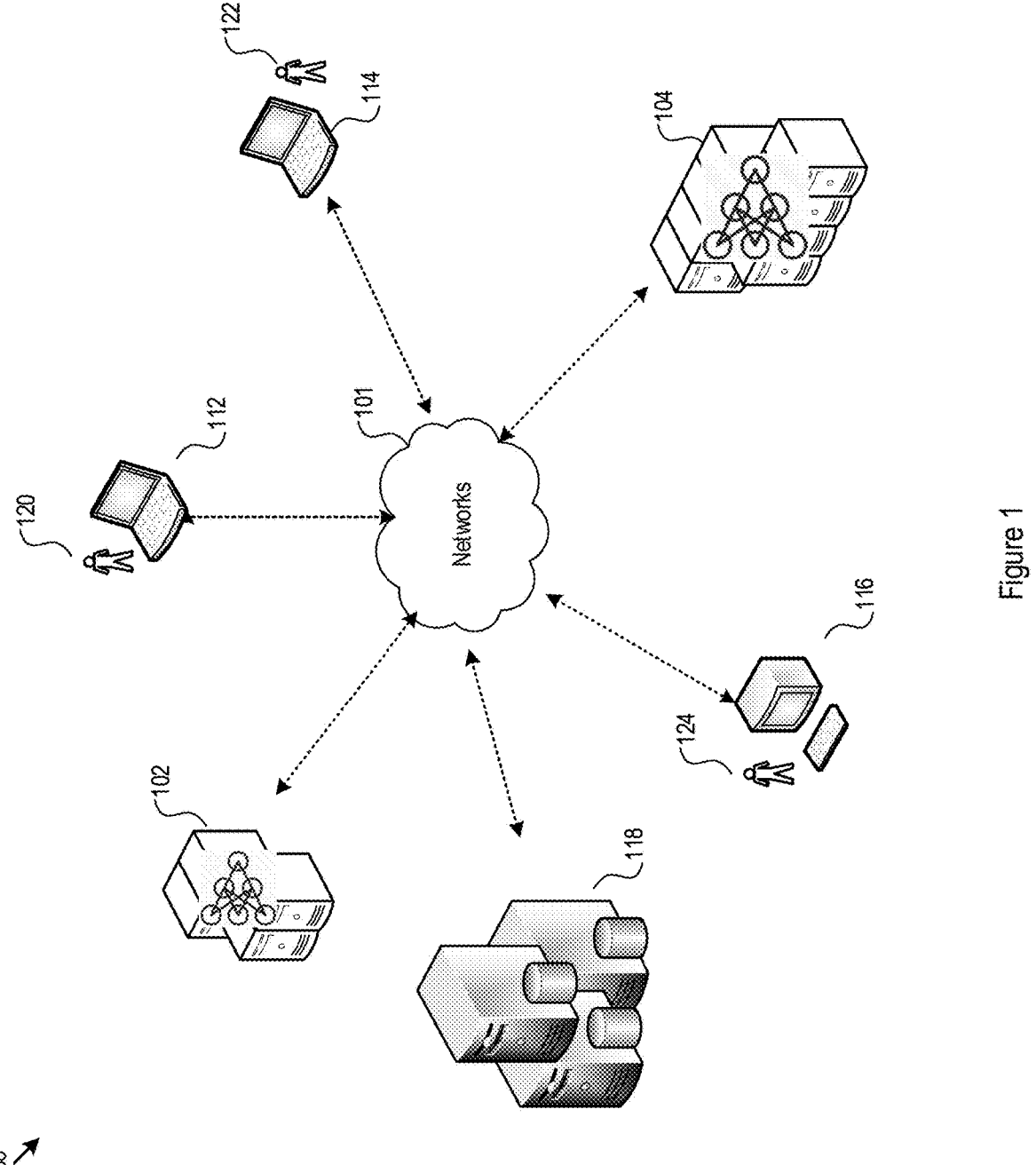
FIG. 1 shows an exemplary electronic communication environment for adaptive design and optimization implementations with a physics-informed neural network (PINN).

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes varies embodiments of methods, apparatus, devices, systems, and/or products for adaptive design and optimization implementations to enhance a physics-informed neural network (PINN). The present disclosure may address at least one of the problems related with PINN, resulting in speeding up and improving accuracy in complicated design and optimization workflows based on PINN. Some embodiments in the present disclosure improves computer functionality and technology, for example but not limited to, increasing simulation and/or processing speed by 10~1000 times, simplifying complex design and optimization by allowing human to submit queries and obtain answers fast, and/or reducing computational time, power, and/or storage requirement, for example during the course of simulating multiple (e.g., about 100) design candidates and alternatives. Some embodiments in the present disclosure may be oriented towards making PINNs more robust, more accurate, and quicker when they are used in simulations involving complex geometries and/or complex physics conditions. Some embodiments of the present disclosure may make it possible to use PINNs in complex design and optimization scenarios.

FIG. 1 shows an exemplary electronic communication environment 100 in which adaptive design and optimization using a physics-informed neural network (PINN) may be implemented. The electronic communication environment 100 may include a portion or all of the following: one or more servers 102 and 104, one or more user devices 112, 114, and 116 associated with users 120, 122, and 124, and one or more databases 118, in communication with each other via public or private communication networks 101.

The user devices 112, 114, and 116 may be any form of mobile or fixed electronic devices including but not limited to desktop personal computer, laptop computers, tablets, mobile phones, personal digital assistants, and the like.

The one or more database 118 of FIG. 1 may be hosted in a central database server, a plurality of distributed database servers, or in cloud-based database hosts. The database 118 may be organized and implemented in any form, including but not limited to the physics-governing equations, loss functions, training sample data, parameters of neural networks, and/or the like. The database 118 may be configured to store input data, intermediate data, and/or final results for output.

Figure 2:
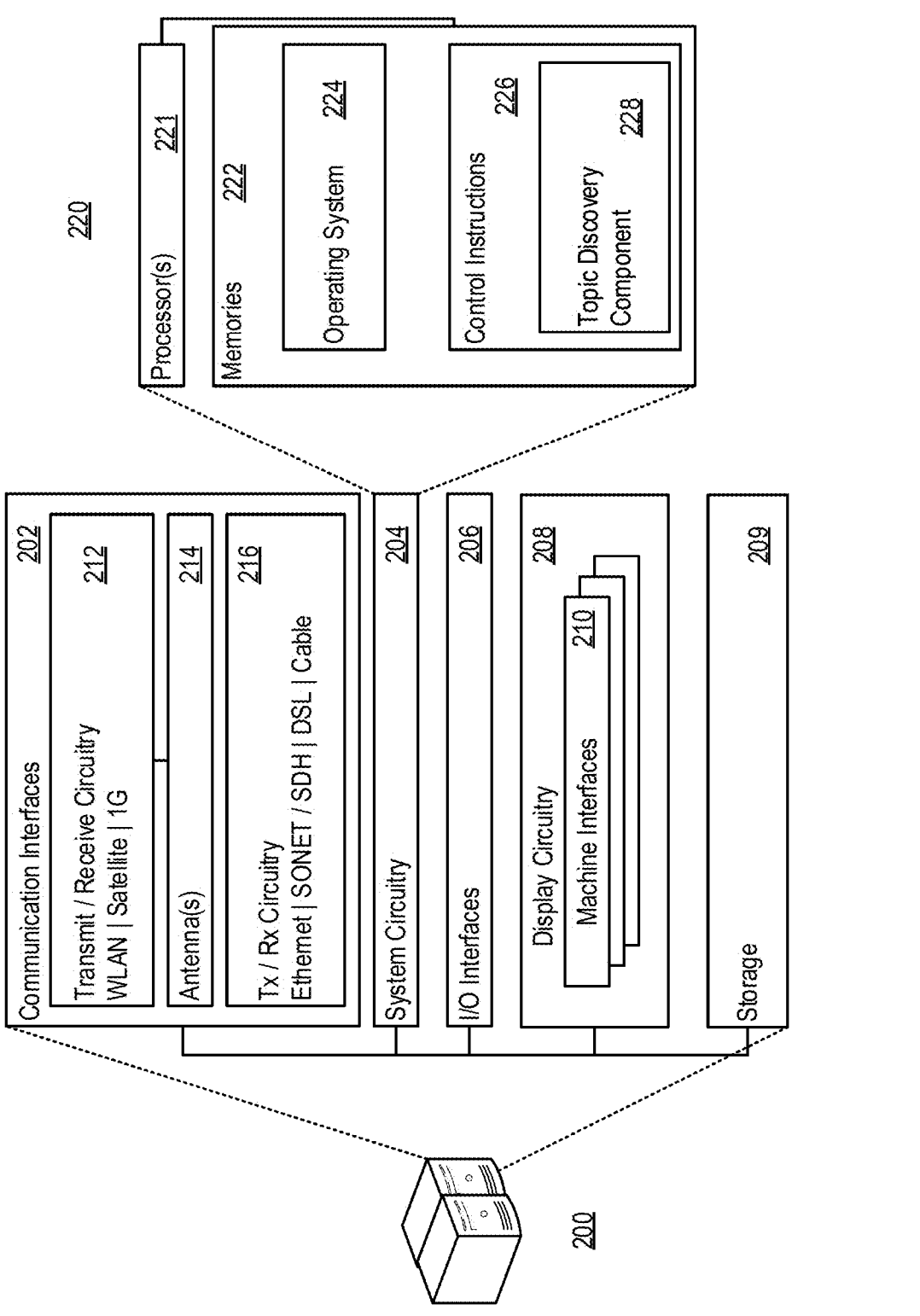
FIG. 2 shows computer systems that may be used to implement various components of the electronic communication environment of FIG. 1.

FIG. 2 shows an exemplary computer system 200 for implementing the one or more servers 102 and 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the adaptive design and optimization with a PINN. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the adaptive design and optimization with a PINN. The system circuitry 220 may include one or more processors 221 and memories 222. The memories 222 stores, for example, control instructions 226 and an operating system 224. The control instructions 226, for example may include instructions for implementing the components 228 of adaptive design and optimization with a PINN. In one implementation, the instruction processors 221 execute the control instructions 226 and the operating system 224 to carry out any desired functionality related to the adaptive design and optimization with a PINN. The memory 222 may be non-transitory memory, which may include computer-readable media (CRM) that stores data for short periods or in the presence of power, for example but not limited to, a random access memory (RAM) device.

Various embodiment described in the present disclosure may be widely applicable to many industrial applications in various fields, including but not limited to, aircraft wing design, high speed train design, small molecular design, protein folding and protein design, flight control, chemical engineering, automotive control, medical diagnosis and/or treatment, and oil/gas exploration. The present disclosure describes various embodiments with using the design/optimization of turbine blades as non-limiting examples.

Figure 3:
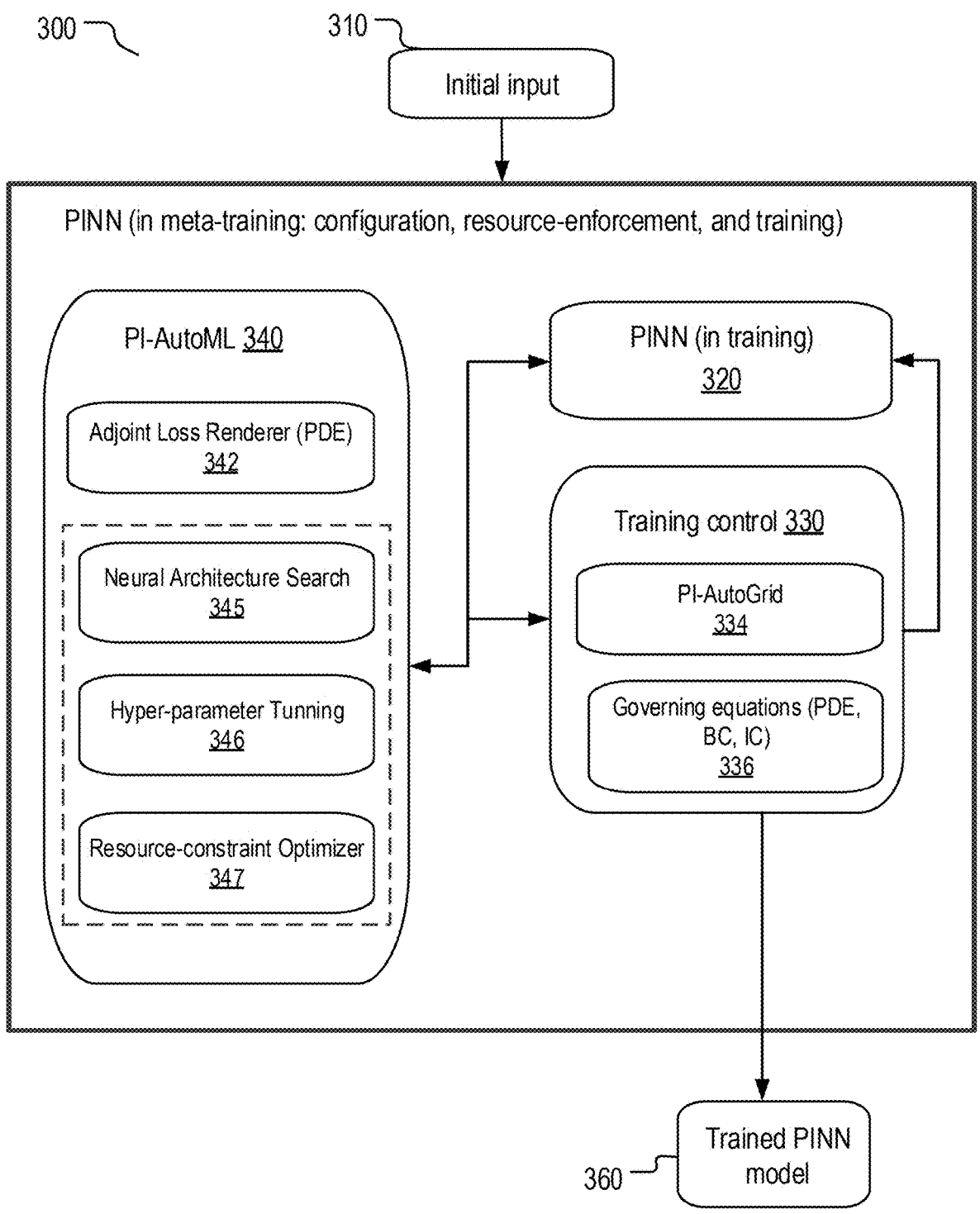
FIG. 3 shows an exemplary system architecture diagram of physics-informed neural network platform (PINN platform).

Referring to FIG. 3, the present disclosure describes a system 300 for training a physics-informed neural network to adaptively design and optimize an engineering design. The system 300 may include a portion or all of the following: a to-be trained NN (or referred as PINN) (in training) 320, a training control 330, and/or a PI automatic machine learning (PI-AutoML) 340. The PINN may receive an initial input (310), which may include a portion or all of the following: a set of collocation points depicting the 1D, 2D, or 3D discretization of the region where governing PDEs are to be satisfied; and/or a time variable depicting the state of an unsteady system at a given instant in time; and/or design parameter(s) pertaining to the variables in the physical problem ought to be modeled by PINN (e.g., a rotation angle range).

The training control may calculate a loss function based on the result from PINN and a set of governing equations (336). When the loss function indicates the PINN satisfying certain criteria (e.g., convergence), the training control may stop training the PINN, and output the trained PINN model. When the loss function indicates the PINN not satisfying the certain criteria, the training control may resample and/or choose collocation points optimally and/or perform automated NN architecture design and hyper-parameter turning for the PINN based on a set of governing equations for next training iteration.

In some implementations, the training control may include a physics-informed (PI) automatic simulation point grid adaptation (PI-AutoGrid) portion (334). The PI-AutoGrid may choose collocation point locations optimally with an adaptive sampling algorithm. PI-AutoGrid continuously resamples collocation points throughout the training of PINN based on the problem setup, requested outputs, and available computation resources. With PI-AutoGrid, sharp gradients that hinder learning of PINNs is alleviated, thus allowing PINNs to learn faster and be more robust in problems involving complex geometries and intricate physical conditions.

In some implementations, the system 300 may include the PI-AutoML (340). The PI-AutoML may be a context- and resource-aware ML model development platform; and can perform automated NN architecture design and hyperparameter tuning for PINNs, for example, the PI-AutoML may include a neural architecture search unit (345), a hyper-parameter tunning unit (346), and/or a resource-constraint optimizer unit (347). In addition, PI-AutoML also includes an 'adjoint loss function' renderer (342) that constructs and augments loss terms belonging to NN and physical problem at hand for improved convergence of the NN. Working in tandem with PI-AutoGrid, PI-AutoML finds appropriate model parameters to create an optimal PINN architecture. A multi-constraint multi-objective optimizer (MOBOGA) and resource-aware AutoML are described in more details in the U.S. patent application Ser. No. 16/749,717 filed on Jan. 22, 2020, which is incorporated by reference in its entirety.

Referring to FIG. 4, the present disclosure also describes a method 400 for adaptive design and optimization using a PINN. The method 400 may include a portion or all of the following steps: step 410, inputting collocation points and/or design parameters into the physics-informed neural network to obtain an output; step 420, calculating a loss function based on a set of governing equations and the output; step 430, determining whether the physics-informed neural network is convergent based on the calculated loss function; step 440, in response to the physics-informed neural network being convergent, exporting the physics-informed neural network; and/or in response to the physics-informed neural network not being convergent: step 450, determining whether to resample the collocation points; step 460, determining an optimum number of collocation points; step 470, determining a set of optimal network parameters for adjusting the physics-informed neural network; and/or step 480, inputting the collocation points and the set of optimal network parameters to the physics-informed neural network for a next iteration. In some implementations, the set of governing equations comprises a set of gradient computing equations and a set of loss computing equations. In some implementations, the set of optimal network parameters includes at least one of the following: a network architecture, a set of activation functions, a set of normalization layers, a set of loss weightings, or a set of learning rate schedules.

In some implementations, the design parameters may refer to a set of design parameters, including, for example, a rotation angle, a range of rotation angles, a length/height/width of an object, and/or a range of length/height/width of an object.

In some implementations, the step 460 of determining the optimum number of collocation points may include determining the optimum number of collocation points based on at least one of the following: a convergence rate of loss function based on a boundary condition (BC); a convergence rate of loss function based on an initial condition (IC); a convergence rate of loss function based on a partial differential equations (PDE); a user-defined output variable fidelity requirement; a gradient minimum threshold; a gradient maximum threshold; a resource constraint, and/or an adjoint loss function.

In some implementations, the step 460 of determining the optimum number of collocation points may include calculating a set of metrics; normalizing the set of metrics; and/or redistributing the collocation points. In some implementations, the normalizing the set of metrics may include normalizing the set of metrics based on a resource constraint, wherein after the normalization, the optimum number of collocation points is within the resource constraint.

In some implementations, the step 420 of calculating the loss function based on the set of governing equations may include calculating a set of gradients based on the set of gradient computing equations; and/or calculating the loss function based on the set of gradients and the set of loss computing equations. In some implementations, the set of loss computing equations comprises at least one of the following: a partial differential equation; a boundary condition (BC) equation; an initial condition (IC) equation; and/or an adjoint loss function.

In some implementations, the step 470 of determining the set of optimal network parameters may include determining a set of optimal network parameters based on at least one of a context constraint and a resource constraint. For non-limiting examples, the context constraint may include geometric and/or physical considerations of the problem; and/or the resource constraint may include available processing resources in the computing hardware, such as memory size and processor capability.

In some implementations, the step 470 of determining the set of optimal network parameters may include determining the set of optimal network parameters based on at least one of the following: a problem geometry; a parametrization range; a problem physics; a requested output fidelity; a requested output field; and/or an available resource.

Various embodiments in the present disclosure may be used to build an end-to-end solution, providing a fast, accurate, human-in-the-loop design and optimization system across manufacturing industries. Some implementations may employ deep neural networks with governing physics equations in an intelligent manner to reduce the need for training data; and in some implementations, to minimize or eliminate the reliance on training data that has to be collected from physical experimental setups and real-world sensors.

Some embodiments in the present disclosure may interject automated and semi-automated agents in the end-to-end flow by allowing user to only answer basic questions, and then translate them into actual parameters and hyper-parameters that are monitored or modified automatically.

Some embodiments in the present disclosure may translate metrics, constraints, and governing physics into design parameters in PINN.

In some implementations, development of engineering products, or more generally 'systems', typically takes place over multiple iterations—with human engineers and other decision makers involved in the overall process. Starting with a baseline design, various performance characteristics of a designed part are tested repeatedly and the design is modified until all required criteria are satisfied. As it may be infeasible to manufacture and run physical experiments on all of the design variations produced during iterations, engineers have long been relying on numerical simulation techniques such as finite element method (FEM) (and their closely related methods, e.g. finite volume method (FVM), finite difference method (FDM), or lattice-Boltzmann method (LBM)) to simulate and further test the physical 'behavior' of these designs that can mathematically be represented by partial differential equations (PDEs) or ordinary differential equations (ODEs), $$\frac{\partial q}{\partial t} + \mathcal{N}[q] = 0, (x, y, z) \in \Omega, t \in [t_0, t_1]$$

Here, q, t, $\Omega$, (x, y, z) denote, respectively, the variable of interest pertaining to the governing physics, time, domain geometry, spatial variables. Also, N [.] may represent the non-linear differential operator that essentially provides the evolution of the system under the governing physical laws.

Fundamentally, these methods split the complex geometry of an engineering design into smaller pieces (aka 'elements') and impose certain physical laws, (aka 'governing equations') on every piece. These laws are generally in the form of differential equations (equations defining fluid flow, heat transfer, structural stresses etc.) of the properties that the user are interested in finding out towards their desired design/configuration. Many everyday products, such as airplanes, computer circuits, and body implants, and their parts took their current form after undergoing such design process.

As these simulation techniques have become more reliable and more automation-friendly, various industries have been interested in using them for seeking optimum designs that minimize/maximize certain performance metrics. In almost all of these cases, the optimization workflow adapted is based on iteratively selecting a 'candidate design', simulating the design, and based on the obtained performance metrics, altering it to move towards the 'best' and 'optimal' design.

This approach may be successfully applied for simpler problems; and it has been challenging with some issue/problems when dealing with more complex problems. This may be due to the fact that conducting high-fidelity simulation of physics in complex and many real-world applications, e.g. airflow over a real-size airplane, ion and charge transport in an electric vehicle's battery, or capacity estimation of an underground oil reservoir, requires a huge amount of computational resources—in the form of compute memory, CPU/GPU, number of grids, time steps— and input from engineers or subject matter experts (SMEs) which may render such approaches impossible.

Since their inception in 1950s, neural networks (NNs) have long been regarded as computing systems to emulate biological learning process due to their artificial connected units inspired by the neurons in animal brains. However, their expressive power hasn't reached the anticipated levels until early 2010s. With broader data availability, enhanced computational resources, and improved algorithms, it may be possible to effectively train deeper NNs (DNNs) that could approximate virtually any function, regardless of its complexity. This has been a paradigm shift for NNs and since then thousands of use cases have arisen across a wide variety of industry sectors.

While DNNs have penetrated into and became useful in many application areas where a large amount data is available and continuously generated, their reliance on big data (e.g., for training purposes) has been an obstacle in some other cases. One of these areas has been the multi-cycle development of engineering products. This process involves multiple levels of detailed physics simulations. Researchers' attempts of using data-driven DNN techniques in lieu of these simulations to generalize solution fields have largely been unsatisfactory. Two main reasons behind these results have been (i) limited quantity of data to train the DNN (due to the large cost of generating simulation data) and (ii) limited generalization capability achieved by DNN models given the inherent high-dimensionality of such problems.

In some implementations, PINNs may be used to solve complex physics problems effectively using DNNs. PINNs are fundamentally distinct from data-driven DNNs in the way that the PDEs (or similarly ODEs) imposed by the governing physics together with the boundary conditions (BCs) and/or initial conditions (ICs) imposed by the setup of the physical problem are embedded into the loss function of the NN. This setup, by formulation, guides prediction of the PINN model toward a physically feasible solution. In other words, a PINN model finds solution to a physical problem by learning to represent the underlying physical phenomena—which is generalizable—instead of extrapolating based on a training dataset. By leveraging the quick inference capability that is inherent to all NNs, PINNs can infer solution for a different geometry within the initial parameterized input space in near real-time, without sacrificing any solution fidelity.

Figure 5:
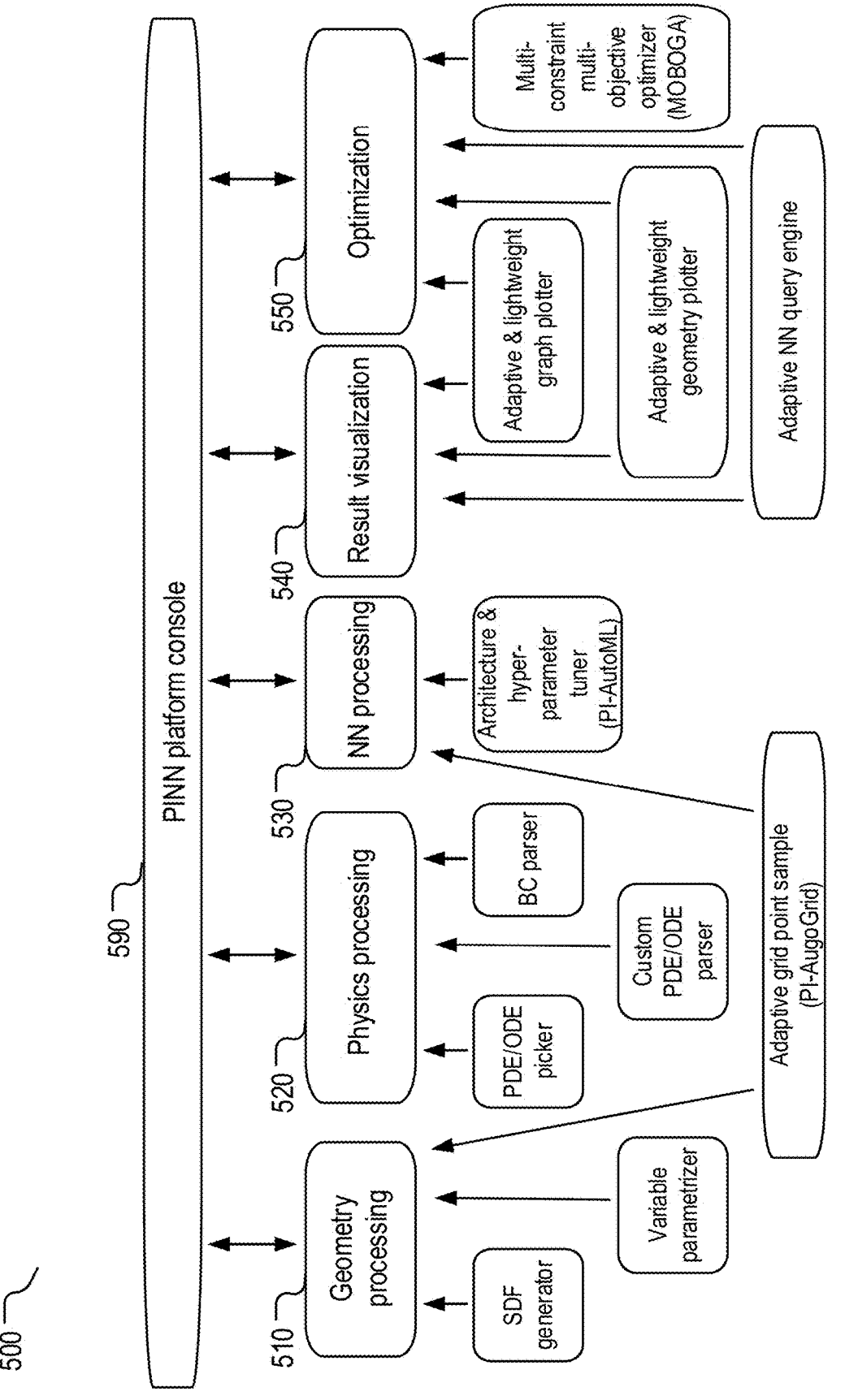
FIG. 5 shows a schematic diagram of an exemplary PINN platform.

Referring to FIG. 5, the present disclosure describes an exemplary PINN platform 500. For non-limiting examples, the PINN platform 500 may include a portion or all of the following: a PINN platform console 590, a geometry processing unit 510, a physics processing unit 520, a NN processing unit 530, a result visualization unit 540, an optimization unit 550.

The PINN platform may include a computational framework that aims to enable design optimization workflows for problems involving geometries or physical processes that have been deemed too complex for optimization via conventional numerical simulation techniques such as FEM and FVM. The PINN platform is based on PINNs, but adds to unique features and components to make it industry-ready and more accessible by minimizing the need for in-depth expertise and knowledge of artificial intelligence (AI), machine learning (ML), and/or DNN to be able to use PINNs in engineering applications.

In some implementations, the geometry processing unit 510 may include a signed distance function (SDF) generator and/or a variable parametrizer. The signed distance function of a set determines a distance of a given point from a boundary of the set, with the sign determined by whether the given point is in the set. The signed distance function may have positive values at points inside the set, decreases in value as a point approaches the boundary of the set where the signed distance function is zero, and the function takes negative values outside of the set. The physics processing unit 520 may include a PDE/ODE picker, a custom PDE/ODE parser, and/or a BC parser. The NN processing unit 530 may include an architecture and hyperparameter tuner (PI-AutoML). In some implementations, an adaptive grid point sample (PI-AutoGrid) may be part of and communicate with the geometry processing unit 510 and the NN processing unit 530. In some implementations, the result visualization unit 540 and the optimization unit 550 may share an adaptive and lightweight graph plotter, an adaptive and lightweight geometry plotter, and/or adaptive NN query engine. The optimization unit 550 may include a multi-constraint multi-objective optimizer (MOBOGA). The MOBOGA is described in more details in the U.S. patent application Ser. No. 16/749,717 filed on Jan. 22, 2020, which is incorporated by reference in its entirety.

The present disclosure describes at least twofold major contributions implemented in the PINN platform. First, the present disclosure tackles the problem of determining the optimum number of collocation points (the discrete nodes in the solution domain at which computation is performed). A physics-informed (PI) adaptive grid point sampler, PI-AutoGrid, dynamically monitors various metrics that are considered to be critical to the problem accuracy as well as available compute resources, and continuously redistributes the collocation points to optimize performance. Secondly, a PI automatic machine learning or PI-AutoML engine performs NN tuning and loss function augmentation to establish an effective PINN scheme for the problem being considered. Similar to PI-AutoGrid, PI-AutoML is also problem- and resource-aware to help the framework be independent from domain-specific peculiarities of the problem. Combined as a singular engine, these two unique features constitute the central adaptive components in the PINN platform to enable a domain-agnostic, user-friendly, and highly-autonomous design optimization framework.

Various embodiments in the present disclosure may include one or both of the following models: physics-informed automatic grid (PI-AutoGrid) and physics-informed automatic machine learning (PI-AutoML). The PI-AutoGrid is implemented as an adaptive sampling algorithm to choose collocation point locations optimally. PI-AutoGrid continuously resamples collocation points throughout the training of PINN based on the problem setup, requested outputs, and available computation resources. With PI-AutoGrid, sharp gradients that hinder learning of PINNs is alleviated, thus allowing PINNs to learn faster and be more accurate in problems involving complex geometries and intricate physical conditions. The PI-AutoML is implemented as a context- and resource-aware ML model development platform that performs automated NN architecture design and hyperparameter tuning for PINNs. In addition, PI-AutoML also includes an "adjoint loss renderer" that constructs artificial loss terms (Iadjoint) for improved convergence of the NN. Working in tandem with PI-AutoGrid, PI-AutoML finds appropriate model parameters to create an optimal PINN scheme.

Figure 6:
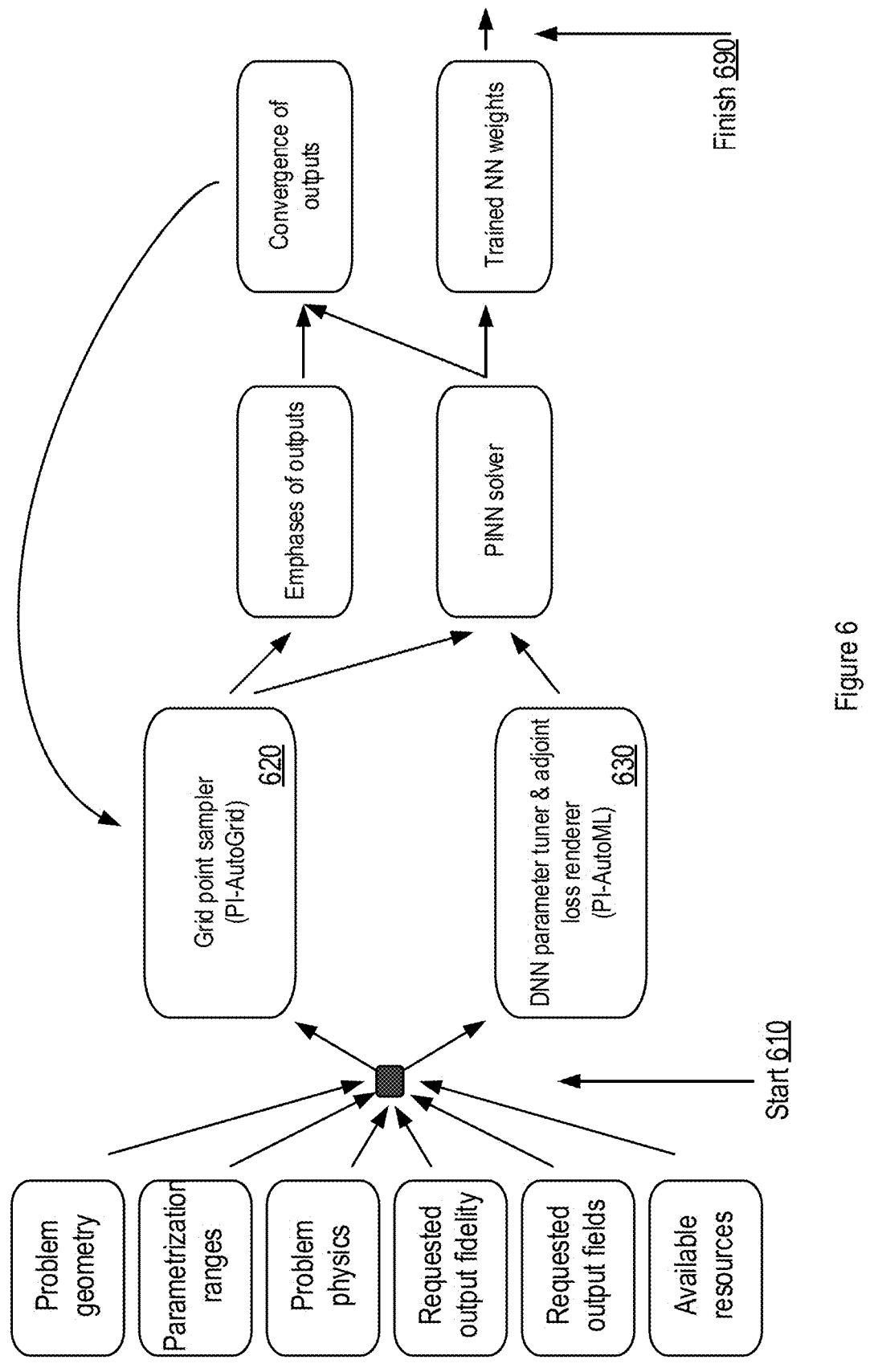
FIG. 6 shows a process flow diagram for implementing physics-informed (PI) automatic simulation point grid adaptation (PI-AutoGrid) and PI automatic machine learning (PI-AutoML).

Referring to FIG. 6, a process flow for a PI-AutoGrid 620 and a PI-AutoML 630 is described from a start 610 to a finish 690.

Figure 7:
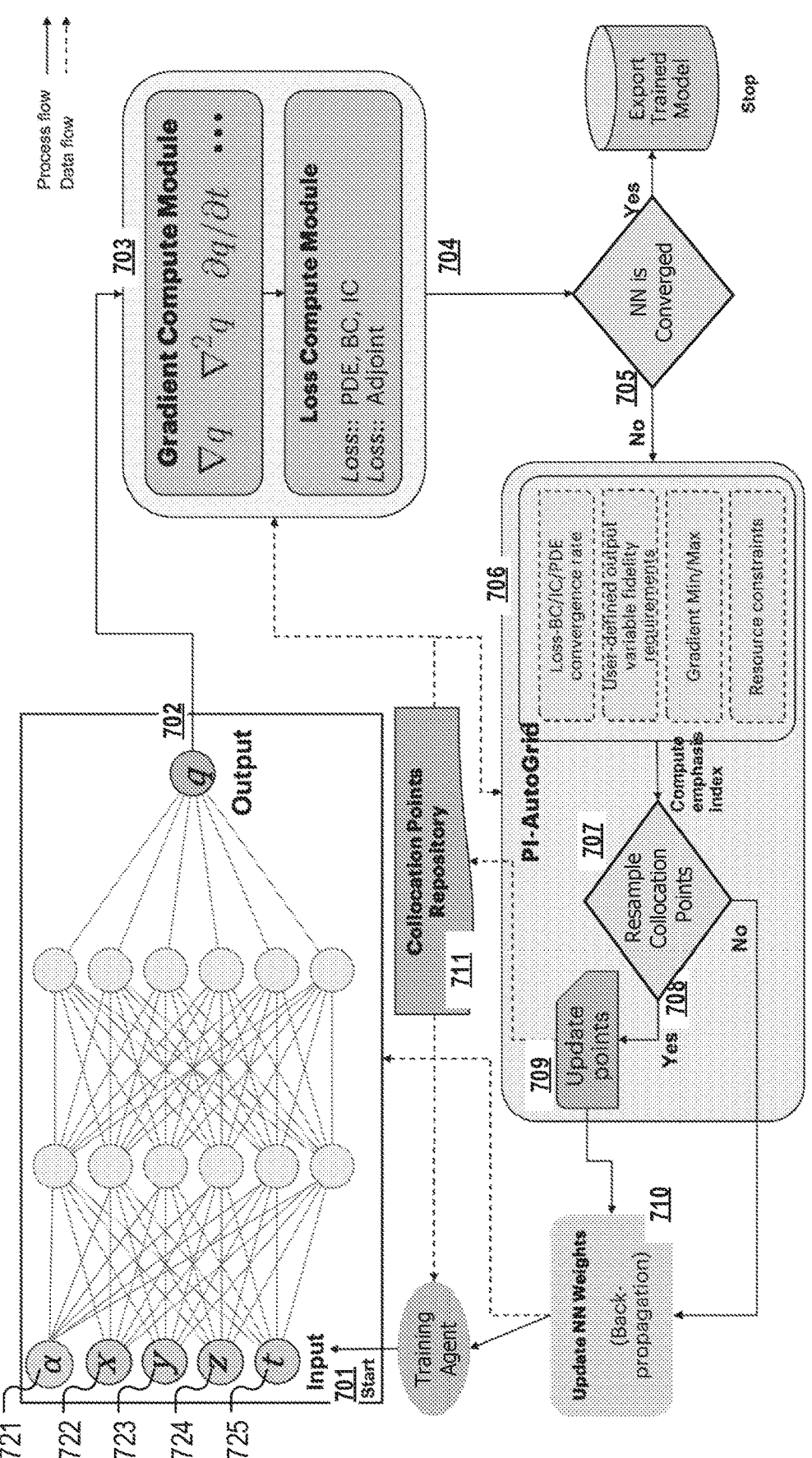
FIG. 7 shows a system architecture diagram of PINN platform in training, which uses PI-AutoGrid to adaptively resample collocation points.

Referring to FIG. 7, a system architecture of an exemplary PINN platform in training is described. An NN network receives an initial input (e.g., including collocation points and/or design parameters) 701, and sends out an output 702 into a gradient compute module and a loss compute module 703, whose output 704 is used to determine whether the NN is converged 705. When the NN is converged, the trained PINN model is exported. When the NN is not converged, a PI-AutoGrid 706 is configured to adaptively resample collocation points. Emphasis index is computed according to at least one of the following: loss-BC/IC/PDE convergence rate, user-defined output variable fidelity requirements, gradient minimum/maximum, and/or resource constraints. The emphasis index is used to determine whether to resample collocation points (707). When it is determined to resample collocation points 708, the collocation points are resampled and/or updated (709), and then the NN weights are updated (e.g., via back-propagation algorithm) (710). When it is determined not to resample collocation points, the NN weights are updated (e.g., via back-propagation) (710). The updated NN weights and/or the resampled collocation points are used to train the NN for next iteration (optionally, via a training agent).

In some implementations, the input of the NN network may include a set of neurons corresponding to the input of collocation points and/or design parameters. For one example, referring to FIG. 7, neurons (722, 723, and 724) may correspond to spatial coordinates (x, y, and z), respectively; and/or a neuron (725) may correspond to a time coordinate (t).

In some implementations, a user may need to vary a design parameter and/or bundle many simulations for various geometries and/or fluid flow regimes. Thus, a new neuron (721) to the input layer of the neural network, and the new neuron corresponds to the parameter of interest that ought to vary. For example, a parameter of interest may be an angle (or varying the angle); one additional neuron may be added, in addition to the neurons (722, 723, 724, and 725) corresponding to x,y,z, and t; and the range of angle of interest may be included as parameterized/discrete points as part of the training set.

In some implementations, a user may aim for optimization of more than one parameter in at time along with various fluid flow regimes. Thus, one neuron per parameter of interest may be added to the input layer, e.g. neuron alpha (representing rotation angle), neuron beta (representing vertical length), neuron gamma (representing horizontal length), etc.

In some implementations, a collocation points repository 711 may communicate with at least one of the following to send/receive collocation points: the gradient & loss compute module 703, the PI-AutoGrid 706, the collocation point updating unit 709, and/or the training agent.

Below, the present disclosure describes the PI-AutoGrid and PI-AutoML components for assisting the PINN in details.

Regarding PI-AutoGrid, fundamental working principle of PINNs builds on guiding the output field (e.g., velocity distribution in the solution domain of a fluid flow) to the criteria in the loss function that has been prescribed by the governing physics laws (e.g., Navier-Stokes equations; PDEs that describe the fluid flow) and BCs/ICs (e.g., No-slip BC on the surface of a stationary object) of the problem setup. On the technical side, this objective is realized through NN training by altering weights of the neurons to those that minimize the 'loss function'. The input to the first layer neurons of NN are the spatial coordinates (as well as temporal values in time-dependent simulations) of the predetermined discrete points, also known as 'collocation points', over which this minimization calculation is performed. In other words, the total loss J to be minimized is composed of the cumulative deviation (e.g., residual or error) from the physical phenomena at collocation points as in $$J \equiv \frac{1}{M} \sum_{i=1}^{M} l_i^{PDE} + \frac{1}{N} \sum_{j=1}^{N} l_j^{BC} + \frac{1}{T} \sum_{k=1}^{T} l_k^{IC}.$$

Here, M, N, and T denote, respectively, the total number of: a) interior collocation points, b) boundary (collocation) points, and c) initial condition (collocation) points. In the above equation, $$l_i^{PDE}, l_j^{BC}, \text{ and } l_k^{IC}$$

refer to different classes of loss terms computed at the i-th, j-th, and k-th collocation point; the deviation of the prediction of NN from the governing physics (represented by PDE) or from constraints imposed by the problem setup—required by any initial value problem (IVP) or boundary value problem (BVP), i.e. BC or IC. In some or all embodiments, computing a loss function, such as residual of the PDE at any spatial (or similarly temporal) collocation points requires computing the below partial derivatives of different orders. Some typical examples that occur in across various physics governing equations may include:

$$\nabla q = \left[ \frac{\partial q}{\partial x} \quad \frac{\partial q}{\partial y} \quad \frac{\partial q}{\partial z} \right]^T,$$

$$\nabla^2 q = \left[ \frac{\partial^2 q}{\partial x^2} \quad \frac{\partial^2 q}{\partial y^2} \quad \frac{\partial^2 q}{\partial z^2} \right]^T,$$

$$\frac{\partial q}{\partial t}, \frac{\partial^2 q}{\partial t^2},$$

In traditional numerical simulation methods (such as FEM), this may pose a challenge since it may introduce numerical instabilities that have to be treated carefully. On the other hand, DNNs are inherently equipped with automatic differentiation operators that are accurate, stable, and fast, and can overcome the instability problem that occurs in many FEM (and its family techniques) applications using combination of optimization solver engines, (e.g. Adam optimizer) as well as regularization operators.

Spatial and temporal distribution and number of collocation points are found to have a strong influence on the training performance of a PINN. Two competing factors are the main causes of this effect: (i) More collocation points are needed for higher solution resolution at the regions where physical phenomena have strong or abrupt variation (e.g., at turbulent flow regions where sharp gradients occur). (ii) On the other hand, loss terms of collocation points that are located at sharp geometries exhibit poor convergence behavior due to their sensitivity. An effective way to optimize this trade-off has been to only increase the number of collocation points at regions exhibiting very strong variations (or gradients) yet keeping their weights in the total loss relatively smaller.

With PI-AutoGrid, the present disclosure describes an autonomous algorithm for choosing collocation points optimally. PI-AutoGrid is context-aware in the sense that it is informed by the geometric and physical considerations of the problem, outputs requested by the user, and available processing resources in the computing hardware. The PI-AutoGrid is integrated into the PINN training loop and thus it is aware of the training state. Such integrated architecture allows for running the PI-AutoGrid continuously and re-evaluate the distribution of collocation points during the training step of building PINN.

By leveraging problem-context and training-state awareness properties, PI-AutoGrid continuously calculates an 'importance metric' called "emphasis" for each output parameter at every pre-specified grid point in the domain. During the evaluation of the emphasis of an (output, location) pair, PI-AutoGrid considers how much importance the user gives to that output field at that particular location as well as the computational effort to compute it. For instance, consider problem involving a high Reynolds number (Re) fluid flow past a cylindrical disk. If the user is interested in finding the flow behavior at the turbulent region behind the disk (a.k.a. wake of a bluff body), PI-AutoGrid will assign a high emphasis to it because (i) the user would like an accurate output there, and (ii) the result there will be hard to compute due to large gradients in turbulent regime.

Emphasis terms are then normalized according to the available computation resources to ensure the total number collocation points are within the limits of the hardware. These (output, location) emphasis pairs influence two metrics of PINN: (i) Sampling probability distribution of collocation points at a given location and (ii) contribution of a (output, location) pair to the total loss function J. The latter can also be adjusted by geometric criteria to further improve training convergence characteristics by avoiding large gradients at sharp edges.

Some experiments may indicate that the training speed and accuracy of PINNs improve when PI-AutoGrid is enabled in an experiment compared to the cases where collocation points are sampled via uniform sampling and total loss J is not influenced by the factors enabled by PI-AutoGrid.

Regarding PI-AutoML, designing proper 'architecture' for a DNN has proved to be a domain specific and, therefore, has been an active research area in the past decade. For example, DNNs that showed excellent performance in image classification tasks are configured using convolution layers in, e.g., convolutional neural network (CNN). Designing the right architecture along with fine-tuning training hyper-parameters (e.g. learning rate) may require a lot of experience and input from human SME. To remedy this challenge, AutoML (automatic machine learning) was developed to automatically and properly find and recommend DNN architecture(s) and hyper-parameters that could lead to optimal performance for a given DNN amongst a set of other candidate NN models.

In PINNs, inputs to the first layer are fixed/parameterized coordinates of collocation points in the solution space (and a time indicator if time-dependent solution is requested by the user (see 701 in FIG. 7). On the other hand, the outputs connected to the last layer include the solution fields that are requested by the user (q, see 702 in FIG. 7).

Between input and output layer of NN, hidden layers consist of a combination of neurons that are arranged to improve the learning of NN of complex learning tasks. Similar to the flexibility of data-driven NNs, kernels, connections, and activation functions of the neurons in the hidden layers can vary independently. For instance, a dimensional encoding operation can be applied to inputs as in Fourier Network case for removing the inherent bias of PINNs towards low-frequency solutions and improving their performance in the problems involving sharp gradients (e.g. simulation of fluid flows and shocks in super-sonic flights).

In some embodiments, a PI-AutoML may include two main components: (i) DNN tuner and (ii) adjoint loss renderer. DNN tuner is, by its nature, similar to traditional AutoML algorithms. A NN architecture search (via NAS) and hyper-parameter search (via HPS) may be combined to come up with a DNN that is efficient to learn solving the physics problem.

Core technology and algorithms used to enable the DNN tuner in the PI-AutoML may be is in part demonstrated in the prior innovation, for example in the U.S. patent application Ser. No. 16/749,717 filed on Jan. 22, 2020, which is incorporated by reference in its entirety.

The second component of the PI-AutoML, adjoint loss renderer, on the other hand is novel for PINNs and is physics-aware. With adjoint loss renderer, artificial constraints may be constructed that are already implicitly stated by the components of total loss function J (via $I^{PDE}$ $I^{BC}$ or $I^C$). These artificial constraints may be explicitly included in J via an adjoint loss term $I^{adjoint}$ The final form of total loss J becomes:

$$J \equiv \frac{1}{M}\sum_{i=1}^{M} I_i^{PDE} + \frac{1}{N}\sum_{j=1}^{N} I_j^{BC} + \frac{1}{T}\sum_{k=1}^{T} I_k^{IC} + \frac{1}{V}\sum_{l=1}^{V} I_l^{adjoint}.$$

In addition to the notations in a previous equation, here V denotes the total number of adjoint terms. Better training speed and convergence rate may be observed in the experiments where $I^{adjoint}$ term is included by making the NN explicitly aware of these otherwise implied constraints via PDEs, BCs, and ICs. In the platform, construction and the functional form of the adjoint loss function are performed by using a hierarchical re-enforcement of the underlying physical laws applied in the problem at hand. For example, in the case of the simulation of fluid flow over an airfoil, a subject matter expert (SME) ought to pick the Navier-Stokes equations as the PDE to simulate the problem. The PI-AutoML may be utilized to construct adjoint loss function that could ensure a strict (hard-constraint) of global mass conservation over the entire domain geometry. In essence, the PI-AutoML may construct and recommend this 'hard-constraint' as an additional requirement for NN to learn while in the training phase.

The present disclosure describes a non-limiting exemplary use-case with designing and/or optimizing a turbine blade. In this exemplary use-case, hypothetical company XYZ may need to design their next generation turbine blade. The reasons may include that new government regulations require a reduction of at least 10% in emission in next the 5 years, and/or cost reduction in operation cost targets for at least 5%. Due to dramatic changes required for this upgrade, the design team of Company XYZ estimated that they have to run at least ~200 independent Computational Fluid Dynamics (CFD) simulations for different geometrical and fluid regime parameters, and each run needs ~1 week to complete. Since they have only a limited number of simulation software licenses, the design team cannot run more than 5 simulations at the same time. With the limited resource, the design team wanted to know whether they could: know how to reduce the time for each simulation, avoid recreating geometrical mesh for every new case, each candidate simulation does not start from scratch, i.e. IC, have an interactive & 360 degree view on the physics, and design optimization process simultaneously, for every new idea and minor changes, they did not have to run a completely new CFD simulation, know how to use prior knowledge in a meaningful way, or is there a meaningful way to incorporate data from previous generation blade to speed up the optimization process.

The PINN platform may provide three onboarding categories for a user to choose from. Category 1 is exploration, wherein the user has a particular geometry and physical system with very clear setup & physics, and/or wants to explore different parameters obtained from high fidelity simulations in fast and accurate manner. Category 2 is design and optimization, wherein the user has a baseline design and wants to improve/optimize it further, knows design parameters, and their ranges in this setup, knows or will choose relevant metric(s) considered in optimization, does not have resources to generate mesh for every design candidate, and/or can use this tool as a 'decision support agent' to explore 'what-if' scenarios, fast and accurately. Category 3 is knowledge augmentation, wherein the user has prior (partial/incomplete) domain knowledge as well as collected data for a specific problem (e.g. wind-tunnel measurements), and/or need to infer the underlying 'physics' and 'rules' in the problem at hand w/o compromising the fidelity and accuracy of the simulations. For this exemplary use-case, the design team of Company XYZ may choose Category 2.

Next step, the PINN platform may provide a plurality of industry sectors for a user to choose from. The plurality of industry sectors may include semi-conductor (e.g., packaging), oil & gas (e.g., reservoir modeling), aerodynamics, finance (e.g., market analysis), material science (e.g., composites), electro-chemistry (e.g., battery), and other industry sector. For this exemplary use-case, the design team of Company XYZ may choose Aerodynamics.

Next step, based on the chosen industry sector of Aerodynamics, the PINN platform may recommend a plurality of governing physics for a user to choose from—In the form of PDEs and ODEs. The plurality of governing physics may include: fluid mechanics, heat/energy transfer, structural mechanics, electro-magnetics, sound & acoustics, chemistry, or the like. For this exemplary use-case, the design team of Company XYZ may choose fluid mechanics.

Next step, the PINN platform may take/import a baseline geometry, and ask for setting design parameters, and select goals, which include minimum drag on the blade, minimum drag/lift ratio, maximize separation point angle, and/or other custom goal.

Next step, the PINN platform may recommend a plurality of governing equations for a user to choose from or the user may input/define governing equations manually. For this exemplary use-case, the design team of Company XYZ may choose an equation for conservation of mass and an equation for conversation of momentum.

Next step, the PINN platform may ask a user to select/input boundary conditions. For this exemplary use-case, the design team of Company XYZ may input certain constraints (velocity, pressure, or the like) as boundary conditions.

Next step, the PINN platform may ask a user to select a simulator mode, and/or grid and neural network for the model training and convergence. For this exemplary use-case, the design team of Company XYZ may select aggregate mode for the simulator mode. Unlike 'Serial Mode' in which every design candidate simulated separate, in 'Aggregate Mode', all design candidates are simulated in one single run, using one single DNN. Under some circumstances, aggregate mode may speed-up by ~50 times with ~50 times savings on storage.

For this exemplary use-case, the design team of Company XYZ may select adaptive resampling as the grid. As PINN is training the model, 'adaptive resampling unit' (ARU) monitors the accuracy of PDEs via the residuals and loss function values computed. The ARU pre-emptively modifies/adds new grid nodes (in the form of 'collocation points' discussed earlier) in spatial regions with lowest precision, avoiding re-starting the simulation if initial set of grid points (and the corresponding collocations points) was not of good quality.

For this exemplary use-case, the design team of Company XYZ may select PA-AutoML as the intelligent architect where it can construct and facilitate training of the neural network. The PA-AutoML enables PINN find the best architecture concerning the physics and DNN constraints simultaneously. Selecting this intelligent unit, can help fine-tune hyper-parameters such as: number of layers, number of neurons per layer, activation function type, batch-size, and learning rate. These hyper-parameters may be configured automatically.

Figure 8A:
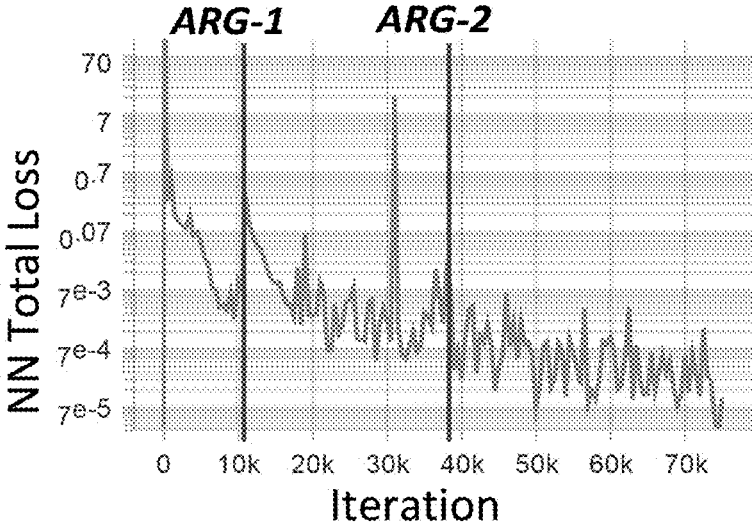
FIGS. 8A-8G show some implementations in an exemplary embodiment of the present disclosure.
Figure 8B:
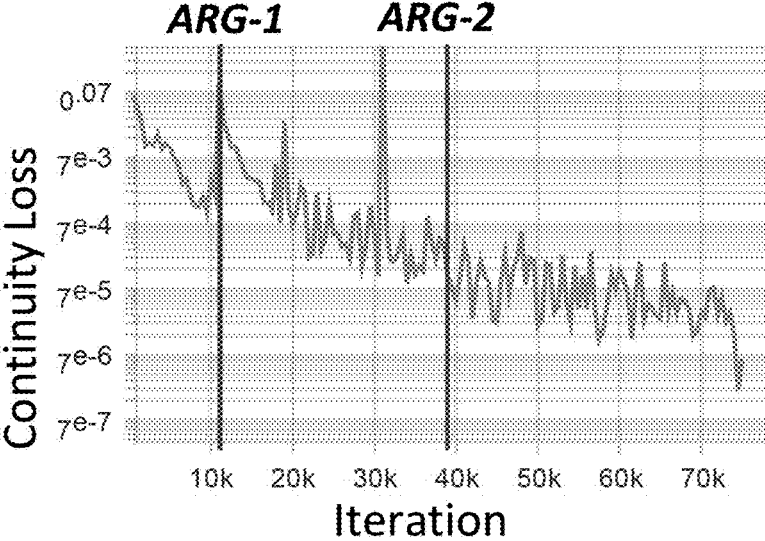
Figure 8C:
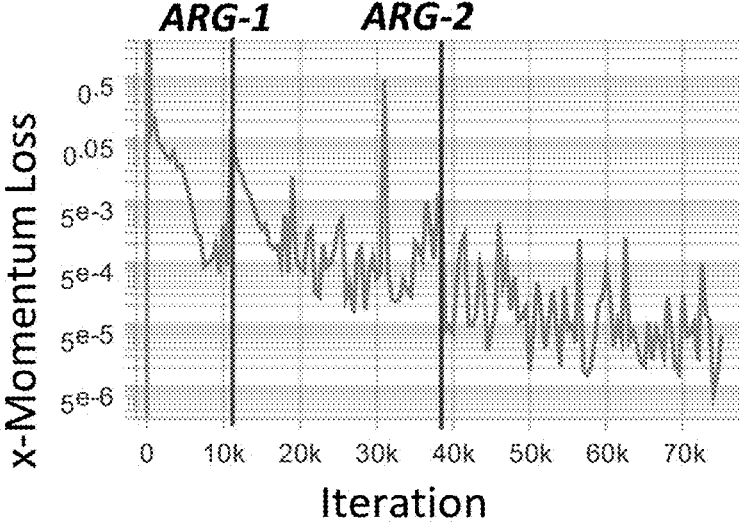

Next step, the PINN platform begins model training, and for this exemplary use-case, the adaptive grid resample is Active, wherein at ARG-1, 1,450 new grid points (and their corresponding collocation points) are added, and at ARG-2, 500 new grid points (and their corresponding collocation points) near solid surface are added. The NN total loss is shown in FIG. 8A, illustrating the decreasing NN total loss with increasing iteration number. Various loss components, including but not limited to, mass conservation violation loss (a.k.a. continuity loss), Momentum loss along x-axis (x-Momentum loss), Momentum loss along y-axis, Momentum loss along z-axis, Neumann BC loss, Inlet velocity loss, may be visualized individually and separately. For example, FIG. 8B shows the continuity loss, and FIG. 8C shows the x-Momentum loss.

Figure 8D:
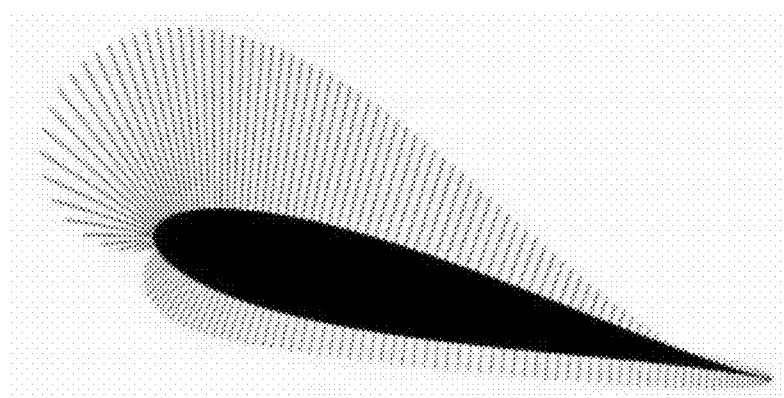

When the model training is complete, the PINN platform may output results including engineering metrics of interest (e.g., pressure, velocity along horizontal, velocity along vertical, and/or etc.), and/or charts or figures to visualize the metrics. For example, FIG. 8D shows a pressure distribution along surface of the turbine blade.

Figure 8E:
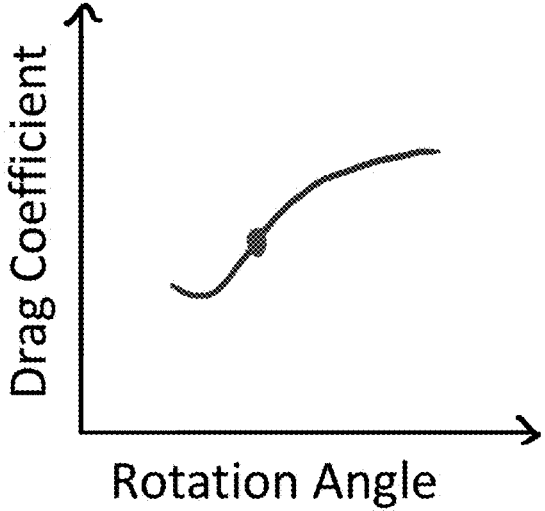

A user may use the PINN platform to optimize the design. For example, the user may select a particular metric value varied by a particular parameter. FIG. 8E shows the drag coefficient as a function of blade rotation angle, when the user wants to see the drag coefficient (Cd) varied by a rotation angle.

Figure 8F:
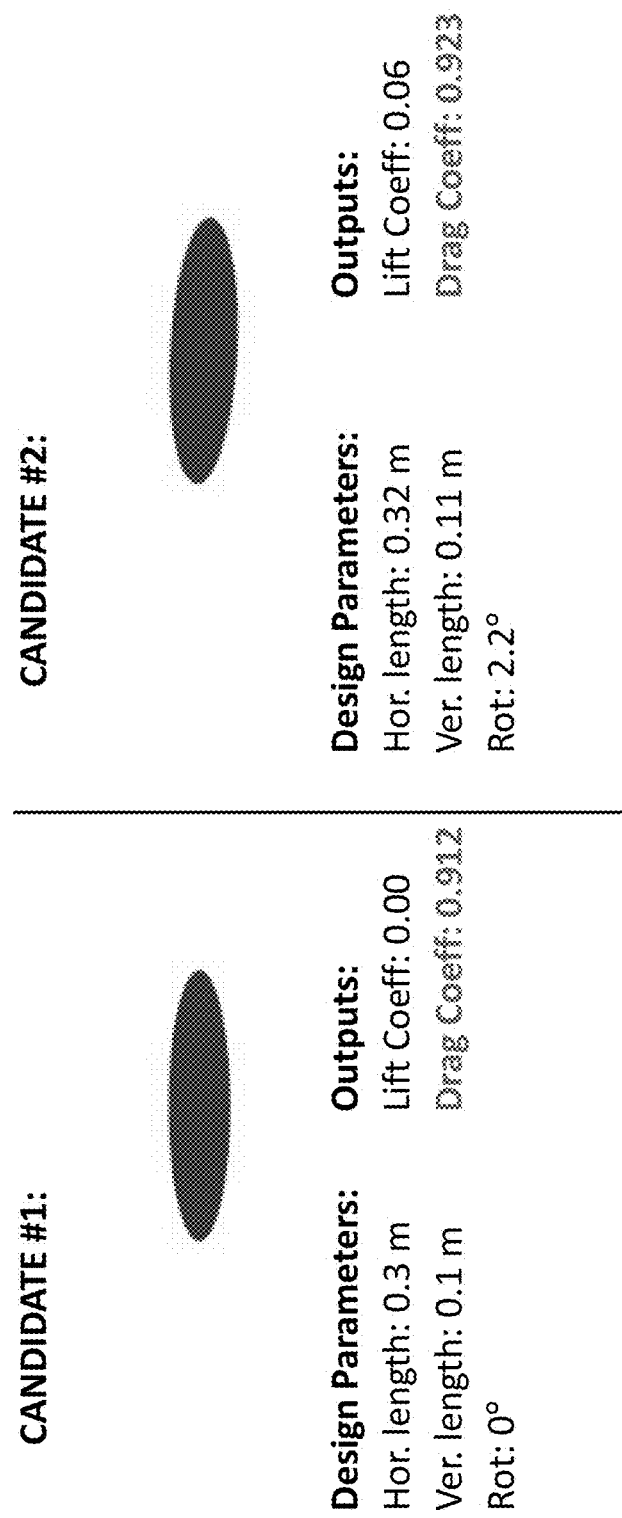

For another example, the user may want to see the designs with minimum metric value subject to a plurality of conditions (e.g., [cond-1]+[cond-2]++[cond-n]). The user wants to see the designs with minimum drag coefficient (Cd) subject to 0.5 m≤horizontal length (Hor. Len.)≤0.55 m, 0.15 m≤vertical length (Ver. Len.)≤0.18 m, and −3°≤Rotation angle≤2°. The PINN platform may output the top N design candidates, in an order from smaller drag coefficient to larger drag coefficient. N may be 10. FIG. 8F shows the top 2 design candidates, wherein the candidate 1 has a drag coefficient of 0.912, and the candidate 2 has a drag coefficient of 0.923.

Figure 8G:
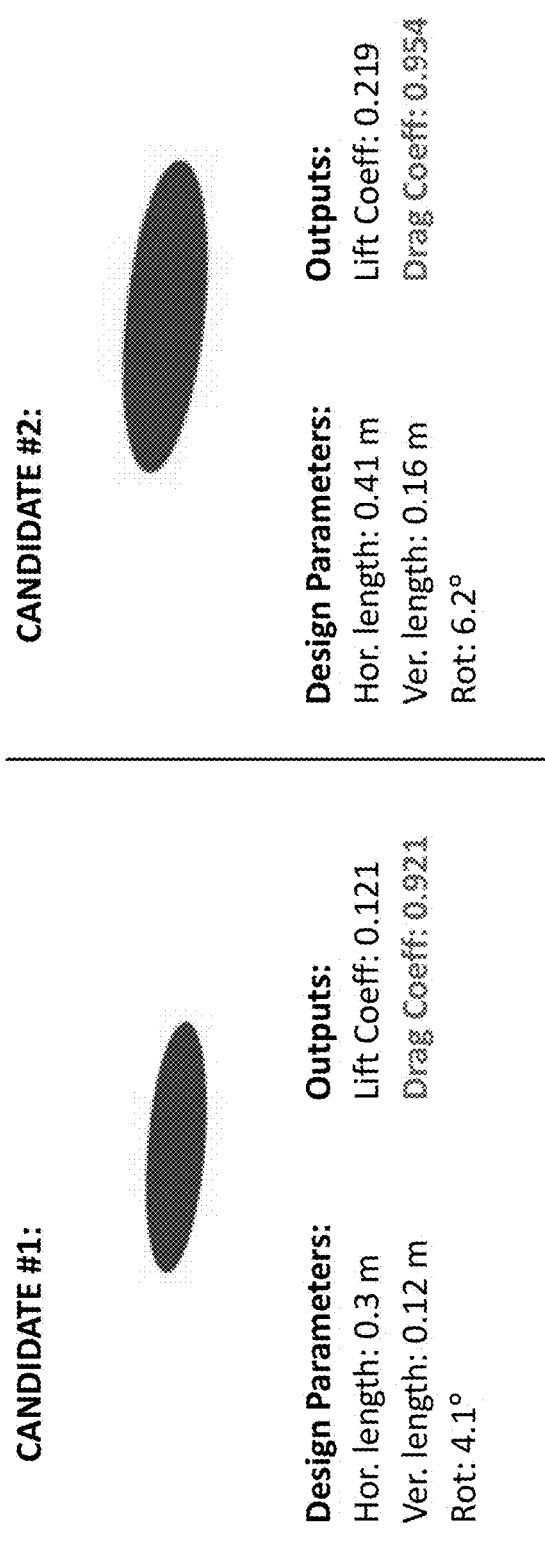

For another example, the user may want to see the top N design candidates under certain conditions. The user may be interested in finding designs with, based on a domain and/or analysis type: first priority: minimum drag; second priority: maximum lift; third priority: furthest separation point; and the like. FIG. 8G shows two design candidates.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal (e.g., non-transitory medium). The non-transitory medium may refer to computer-readable media (CRM) that stores data for extended periods or for short period in the presence of power, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system for adaptive design and optimization of an engineering design using a physics-informed neural network, the system comprising:

a non-transitory memory storing instructions; and a processor in communication with the non-transitory memory, wherein, the processor executes the instructions to cause the system to:

input collocation points and design parameters into the physics-informed neural network to obtain an output;

calculate a loss function based on a set of governing equations and the output;

determine whether the physics-informed neural network is convergent based on the calculated loss function;

in response to the physics-informed neural network being convergent, export the physics-informed neural network; and in response to the physics-informed neural network not being convergent:

determine whether to resample the collocation points;

determine an optimum number of collocation points;

determine a set of optimal network parameters for adjusting the physics-informed neural network, wherein the set of optimal network parameters are determined by integrating a physics-informed automatic simulation point grid adaptation (PI-AutoGrid) into the physics-informed neural network to calculate an importance metric at each pre-specified grid point corresponding to each of the collocation points; and input the collocation points and the set of optimal network parameters to the physics-informed neural network for a next iteration.

2. The system according to claim 1, wherein when the processor executes the instructions to cause the system to determine the optimum number of collocation points, the processor executes the instructions to cause the system to:

determine the optimum number of collocation points based on at least one of the following:

a convergence rate based on a boundary condition (BC);

a convergence rate based on an initial condition (IC);

a convergence rate based on a partial differential equations (PDE);

a user-defined output variable fidelity requirement;

a gradient minimum;

a gradient maximum;

a resource constraint; or an adjoint loss function.

3. The system according to claim 1, wherein when the processor executes the instructions to cause the system to determine the optimum number of collocation points, the processor executes the instructions to cause the system to:

calculate a set of metrics;

normalize the set of metrics; and redistribute the collocation points.

4. The system according to claim 3, wherein when the processor executes the instructions to cause the system to normalize the set of metrics, the processor executes the instructions to cause the system to:

normalize the set of metrics based on a resource constraint, wherein after the normalization, the optimum number of collocation points is within the resource constraint.

5. The system according to claim 1, wherein:

the set of governing equations comprises a set of gradient computing equations and a set of loss computing equations; and when the processor executes the instructions to cause the system to calculate the loss function based on the set of governing equations, the processor executes the instructions to cause the system to:

calculate a set of gradients based on the set of gradient computing equations; and calculate the loss function based on the set of gradients and the set of loss computing equations.

6. The system according to claim 5, wherein:

the set of loss computing equations comprises at least one of the following:

a partial differential equation;

a boundary condition (BC) equation;

an initial condition (IC) equation; or an adjoint loss function.

7. The system according to claim 1, wherein:

the set of optimal network parameters includes at least one of the following: a network architecture, a set of activation functions, a set of normalization layers, a set of loss weightings, or a set of learning rate schedules.

8. The system according to claim 1, wherein when the processor executes the instructions to cause the system to determine the set of optimal network parameters, the processor executes the instructions to cause the system to:

determine a set of optimal network parameters based on at least one of a context constraint and a resource constraint.

9. The system according to claim 1, wherein when the processor executes the instructions to cause the system to determine the set of optimal network parameters, the processor executes the instructions to cause the system to:

determine the set of optimal network parameters based on at least one of the following:

a problem geometry;

a parametrization range;

a problem physics;

a requested output fidelity;

a requested output field; or an available resource.

10. A method for adaptive design and optimization of an engineering design using a physics-informed neural network, the method comprising:

inputting, by a device comprising a memory storing instructions and a processor in communication with the memory, collocation points and design parameters into the physics-informed neural network to obtain an output;

calculating, by the device, a loss function based on a set of governing equations and the output;

determining, by the device, whether the physics-informed neural network is convergent based on the calculated loss function;

in response to the physics-informed neural network being convergent, exporting, by the device, the physics-informed neural network; and in response to the physics-informed neural network not being convergent:

determining, by the device, whether to resample the collocation points;

determining, by the device, an optimum number of collocation points;

determining, by the device, a set of optimal network parameters for adjusting the physics-informed neural network, wherein the set of optimal network parameters are determined by integrating a physics-informed automatic simulation point grid adaptation (PI-AutoGrid) into the physics-informed neural network to calculate an importance metric for each network parameter at every pre-specified grid point corresponding to each of the collocation points; and inputting, by the device, the collocation points and the set of optimal network parameters to the physics-informed neural network for a next iteration.

11. The method according to claim 10, wherein the determining the optimum number of collocation points comprises:

determining, by the device, the optimum number of collocation points based on at least one of the following:

a convergence rate based on a boundary condition (BC);

a convergence rate based on an initial condition (IC);

a convergence rate based on a partial differential equations (PDE);

a user-defined output variable fidelity requirement;

a gradient minimum;

a gradient maximum;

a resource constraint; or an adjoint loss function.

12. The method according to claim 10, wherein the determining the optimum number of collocation points comprises:

calculating, by the device, a set of metrics;

normalizing, by the device, the set of metrics; and redistributing, by the device, the collocation points.

13. The method according to claim 12, wherein the normalizing the set of metrics comprises:

normalizing, by the device, the set of metrics based on a resource constraint, wherein after the normalization, the optimum number of collocation points is within the resource constraint.

14. The method according to claim 10, wherein:

the set of governing equations comprises a set of gradient computing equations and a set of loss computing equations; and the calculating the loss function based on the set of governing equations comprises:

calculating, by the device, a set of gradients based on the set of gradient computing equations; and calculating, by the device, the loss function based on the set of gradients and the set of loss computing equations.

15. The method according to claim 14, wherein:

the set of loss computing equations comprises at least one of the following:

a partial differential equation;

a boundary condition (BC) equation;

an initial condition (IC) equation; or an adjoint loss function.

16. The method according to claim 10, wherein:

the set of optimal network parameters includes at least one of the following: a network architecture, a set of activation functions, a set of normalization layers, a set of loss weightings, or a set of learning rate schedules.

17. The method according to claim 10, wherein the determining the set of optimal network parameters comprises:

determining, by the device, a set of optimal network parameters based on at least one of a context constraint and a resource constraint.

18. The method according to claim 10, wherein the determining the set of optimal network parameters comprises:

determining, by the device, the set of optimal network parameters based on at least one of the following:

a problem geometry;

a parametrization range;

a problem physics;

a requested output fidelity;

a requested output field; or an available resource.

19. A product comprising:

machine-readable media other than a transitory signal;

instructions stored on the machine-readable media; and wherein when a processor executes the instructions, the product is configured to cause the processor to:

input collocation points and design parameters into a physics-informed neural network to obtain an output;

calculate a loss function based on a set of governing equations and the output;

determine whether the physics-informed neural network is convergent based on the calculated loss function;

in response to the physics-informed neural network being convergent, export the physics-informed neural network; and in response to the physics-informed neural network not being convergent:

determine whether to resample the collocation points;

determine an optimum number of collocation points;

determine a set of optimal network parameters for adjusting the physics-informed neural network, wherein the set of optimal network parameters are determined by integrating a physics-informed automatic simulation point grid adaptation (PI-AutoGrid) into the physics-informed neural network to calculate an importance metric for each network parameter at every pre-specified grid point corresponding to each of the collocation points; and input the collocation points and the set of optimal network parameters to the physics-informed neural network for a next iteration.

20. The product according to claim 19, wherein when the product is configured to cause the processor to determine the optimum number of collocation points, the product is configured to cause the processor to:

determine the optimum number of collocation points based on at least one of the following:

a convergence rate based on a boundary condition (BC);

a convergence rate based on an initial condition (IC);

a convergence rate based on a partial differential equations (PDE);

a user-defined output variable fidelity requirement;

a gradient minimum;

a gradient maximum;

a resource constraint; or an adjoint loss function.

* * * * *